United States Patent Office 3,496,431
Patented Feb. 17, 1970

3,496,431
VARIABLE CAPACITOR
Manlio Goetzl, Yonkers, N.Y., assignor to Energy Laboratories, Inc., a corporation of New York
Filed May 31, 1968, Ser. No. 733,668
Int. Cl. H01g 5/02, 5/01
U.S. Cl. 317—245                    10 Claims

ABSTRACT OF THE DISCLOSURE

Device includes housing comprising metallic end caps and intermediate insulating section, fixed and moveable electrodes within housing, and guide member along which movable electrode slides axially. Rotatable actuator effects axial movement of movable electrode via cooperating threaded elements. Pin secured to movable electrode passes through longitudinal slots in guide member to prevent relative rotation between electrodes. Same pin pivotally and slidably supports element through which actuator motion is transmitted to movable electrode. Enlargement on free end of guide member cooperates with collar on interior of one end cap for limiting movement of caps away from each other. Plastic band surrounds insulating section.

---

Figures 1, 2:
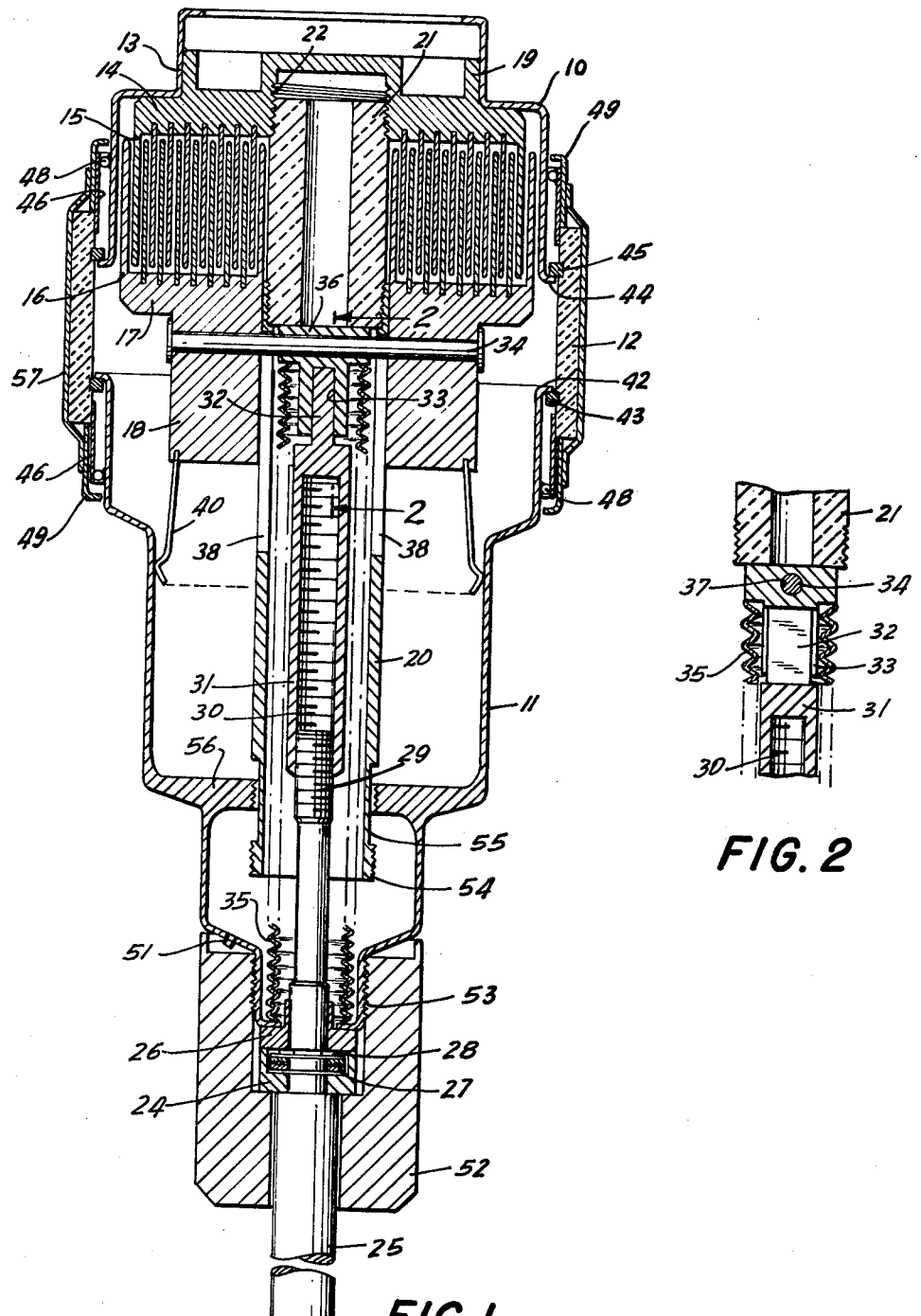

This invention relates to electrical devices, such as variable capacitors, wherein relatively movable electrodes are located within a cylindrical housing, which may be internally pressurized, comprising opposite metallic end caps mounted on an intermediate insulating section.

A device of this type is illustrated and described in my U.S. Patent No. 3,366,852, issued Jan. 30, 1968. Although the device of this patent operates satisfactorily, it is an object of the present invention to provide improvements in the structure of such devices.

More specifically, it is an object of the invention to provide a simplified arrangement of parts for controlling the axial movement of the movable electrode.

It is another object of the invention to provide means for limiting the outward movement of the housing parts, under the influence of the internal gas pressure, in the event that a break develops in one of the parts or in one of the connections between the parts.

To accomplish these and other objectives, the invention provides a fixed electrode secured to one end cap, and a guide member fixed with respect to the same end cap for guiding the axial movement of the movable electrode. In its preferred form, the guide member is a tube having two diametrically opposed longitudinal slots in its wall, and the movable electrode slidably surrounds the tube and carries a pin slidably accommodated within the slots for preventing rotation of the movable electrode. Thus, cooperation between a threaded element non-rotatable with respect to the movable electrode and a threaded element rotatable by an external actuator causes axial movement of the electrode. The threaded element transmits motion to the movable electrode via a flexible transmission within the tube including an element pivotally and slidably mounted on the pin passing through the tube slots. An enlargement on the free end of the guide member cooperates with a collar, on the interior of the end cap opposite the cap to which the guide member is fixed, for limiting the movement of the end caps from each other, and a plastic band tightly surrounds the intermediate insulating section of the housing, which is usually formed of ceramic material, to hold that section together in case is should break.

Additional features and advantages of the invention will be apparent from the following description, in which reference is made to the accompanying drawings.

In the drawings:
FIG. 1 is a longitudinal cross-sectional view of an illustrative device according to this invention; and
FIG. 2 is a fragmentary longitudinal cross-sectional view taken along line 2—2 of FIG. 1.

The device chosen for illustration is a variable capacitor each of whose electrodes is a series of concentric spaced tubes, the tubes of one electrode being interleaved with those of the other, and the electrodes being mounted for relative movement in an axial direction. The electrode assembly is enclosed within a substantially cylindrical housing which may be filled with a gas under pressure.

The housing comprises conductive metal end caps 10 and 11 and an intermediate cylindrical section 12 of insulating material such as relatively thick ceramic. The end cap 10 has an end 13 of reduced diameter which snugly accommodates an upstanding ridge 19 of a metallic plate 14 on which a series of electrode tubes 15 are mounted, the ridge 19 being cemented within the cap portion 13 in air-tight manner by suitable means such as solder or welding. The tubes 15 are concentric with one another and with the axis of the housing.

Interleaved with the electrode tubes 15 is a similar series of tubes 16 mounted on a disk-like carrier 17. This series of tubes is precisely fitted into the spaces between the tubes 15 and this spatial relation must be maintained during reciprocatory movements of the carrier 17 and tubes 16 in an axial direction. To effect guidance of these movements in an accurate and reliable manner, the carrier 17 is provided with an integral cylindrical sleeve 18 coaxial with the housing axis and slidably engaging a fixed tubular guide member 20. The latter is provided with internal threads at its upper end by means of which it is secured to the externally threaded lower end of an insulating element 21 (composed for example of ceramic). At its other end, the insulator 21 is also externally threaded for engagement with an internally threaded bore 22 centrally located in the plate 14. Preferably, the threaded engagements at both ends of the insulator 21 are made permanent by use of a suitable material, such as an epoxy.

As a result of the arrangement described above, the two sets of interleaved electrode tubes are both supported by the same end cap 10, one being rigidly and immovably held, the other being supported for precise axial movement.

The mechanical securement of the end caps 10 and 11 to the medial ceramic section 12 is accomplished as described in the above-identified patent. The end caps 10 and 11 have out-turned flanges 44 and 42, respectively, at their peripheries adapted to engage behind resilient split rings 45 and 43 accommodated within internal annular grooves in the section 12. Any possible impairment of hermetic tightness is guarded against by the mounting of thin sleeves 46 of metallic foil around the annular joints. Each sleeve is bonded at one end to a metallized interior margin of the section 12 and at the other to a wire ring 48 soldered to the exterior surface of its respective end cap. As protection from injury, each sleeve 46 is encircled by a rigid collar 49 cemented to the section 12.

Filling of the housing with a desired gas under pressure may take place through a temporary nipple 51 formed on the end cap 11. After filling, the nipple is sealed off in any appropriate manner. The sealed nipple 51 may be concealed by a member 52 threaded on to a reduced diameter end portion 53 of end cap 11.

Projecting axially through the member 52 and the portion 53 of end cap 11 is a rod-like actuator 25 by means of which the movable electrode structure 17, 18 is reciprocated. The cap 11 carries a tubular guide 26 for the actuator 25, and a holder 24 held against guide 26 by member 52 supports a thrust bearing 27 against which a snap ring 28 on the actuator 25 rests. The inner end of the rod 25 extends into the lower end of tube 20, and is provided with screw threads 29. These engage the internal screw threads 30 on a cylindrical element 31 located within the tube 20.

Because the actuator 25 is journaled in the cap 11, it partakes of any misalignment of the end cap 11 relative to cap 10. For this reason it is very important that the transmission between the actuator 25 and the movable electrode is flexible, i.e., that it be provided along its course with some type of flexible coupling that allows both angular and lateral displacements of the transmission axis on opposite sides of the coupling. In the present device, the upper end of the element 31 is formed with a flat tongue 32 slidably received within a slot or groove 33 provided at the lower end of a head element 36. In its upper region, the head element has a through hole 37 loosely accommodating a pin 34 extending diametrically through the sleeve 18, the ends of the pin 34 being fixed within the sleeve. The hole 37 and pin 34 are in a plane perpendicular to the plane containing the groove 33 and tongue 32. Thus, due to the ability of the tongue 32 and head element 36 to slide in mutually perpendicular directions with respect to the movable electrode 17, 18, and the ability of the head element to pivot about the pin 34 with respect to the movable electrode, the axes of the guide tube 20 and cylindrical element 31 may move out of alignment either angularly or laterally without disturbing the transmission of axial forces. In other words, an accurate maintainance of axial alignment between the actuator 25 and the axis of movement of the electrode is not critical and cannot affect the essential precision of axial movement of the electrode.

The pin 34 extends through two diametrically opposed longitudinal slots 38 in the guide tube 20. Cooperation of the pin 34 and slots 38 prevents rotative movement of the element 31 and the movable electrode, and confines these parts to axial movement. Consequently, rotation of the actuator 25 causes axial movement of the element 31 and the movable electrode via threads 29 and 30. It will be appreciated, therefore, that the pin 34 serves both as part of the flexible transmission and as part of the means for constraining the movable electrode and element 31 to move only axially.

Concentric with both the guide tube 20 and the element 31, and located between them, is a bellows seal 35 secured at its inner end to the head element 36 and at its outer end to the end cap 11. The sleeve 18, integral with the carrier 17, is provided with sliding contact fingers 40 adapted to press yieldably and resiliently against the inner surface of the end cap 11, thereby providing an electrical connection between the movable electrode and the end cap 11.

For the purpose of limiting the outward movement of the end caps 10 and 11 due to the gas pressure, in case of a defect in the connection between the flanges 42, 44 and the rings 43, 45, the guide tube 20 is formed at its free lower end with an externally threaded enlargement 54. In the present example, the enlargement is produced by reducing the external diameter of the tube in the region 55 adjacent to the enlargement. In addition, the end cap 11 is provided on its interior surface with an internally threaded collar 56. The screw threads of the enlargement 54 and collar 56 are cooperable so that the collar may be screwed on to and past the enlargement during the assembly of the end cap 11 with the remainder of the housing. The collar 56 is so located that when the housing parts are completely assembled, the collar surrounds, and is spaced from, the reduced diameter region 55 of the tube 20.

Thus, in normal use, the collar 56 forms no connection between the guide tube and the end cap 11. However, should the connection between either end cap and the ceramic section 12 open, the internal gas pressure will be able to move the end caps apart only a small amount until the collar 56 meets the enlargement 54. Since the collar cannot force its way past the enlargement, and since the guide tube 20 is fixed to the end cap 10 via insulator 21 and plate 14, the guide tube serves as a back-up connection between the two end caps to prevent their separation.

Furthermore, a continuous band 57 of flexible, but tough, plastic material surrounds the ceramic section 12, the margins of the band 57 extending past the edges of the section 12 into engagement with the collars 49. It will be noted that the margins of the band extend inwardly over the ends of the section 12. Consequently, should the section 12 break, the band 57 prevents the broken pieces from moving apart both radially and longitudinally under the influence of the internal gas pressure. One way of applying the band 57 to the device is to use as the band a section of heat-shrinkable plastic tubing which initially has a diameter greater than that of the section 12. However, after the band is placed around the section 12 and subjected to heat, it shrinks and assumes the form shown in FIG. 1.

In the drawings, the movable electrode 16, 17 is shown in its uppermost position with the head element 36 abutting the lower end face of the insulator 21. Since the pressurized gas within the housing acts upon the entire upper face of the carrier 17, but only upon the portion of the lower faces of the carrier 17 and sleeve 18 surrounding the bellows 35, the net effect of the gas pressure is to constantly urge the movable electrode downwardly. Thus, although there is no positive connection between the head element 36 and cylindrical element 31, rotation of the actuator 25 in one direction will permit the carrier 17, head element 36, and element 31 to move downwardly, and rotation of the actuator in the opposite direction will shift these parts upwardly.

The construction described above is particularly simple and efficient because the relatively long tube 20 serves a number of functions, namely, guiding the movable electrode, preventing together with pin 34 rotation of the movable electrode and element 31, and limiting together with the collar 56 the movement of the end caps away from each other. Furthermore, since the guide tube 20 accommodates the bellows 35, the bellows is permitted to extend further into the device than was heretofore possible, and hence the entire unit may be made shorter for an equal length of travel of the movable electrode.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. In an electrical device, a cylindrical housing comprising conductive metallic end caps and an intermediate insulating section, relatively movable electrodes within said housing electrically connected to said end caps, respectively, means carried by one of said end caps for immovably supporting one of said electrodes and supporting the other for precisely guided movement in an axial direction, a movable actuator extending through the opposite end cap, a transmission between said actuator and said movable electrode, said transmission including a screw-threaded element, a cooperating screw-threaded element connected to said actuator, and said supporting means including a hollow tube guide member along which said movable electrode slides during its axial movement, said guide member and movable electrode having cooperable means for preventing relative rotation between them, said cooperable means including a longitudinal slot in said tube and a pin projecting from said movable electrode and slidably accommodated in said slot.

2. An electrical device as defined in claim 1 wherein said movable electrode surrounds said tube, said tube is provided with two diametrically opposed longitudinal slots, said pin extends through both of said slots and into said movable electrode, and said transmission includes a head element within said tube and slidably and pivotally mounted on said pin.

3. An electrical device as defined in claim 2 wherein said head element is provided with a groove located in a plane perpendicular to said pin, and including a tongue slidably but non-rotatably accommodated within said groove, said tongue being connected to said screw-threaded element connected to said actuator.

4. An electrical device as defined in claim 2 including a bellows seal within said tube and extending between said head element and the end cap through which said actuator extends, said actuator extending into said bellows.

5. In an electrical device, an internally pressurized gas-tight cylindrical housing comprising conductive metallic end caps and an intermediate insulating section, relatively movable electrodes within said housing electrically connected to said end caps, respectively, means carried by one of said electrodes and supporting the other for precisely guided movement in an axial direction, a movable actuator extending through the opposite end cap, a transmission between said actuator and said movable electrode, said transmission including a screw-threaded element, a cooperating screw-threaded element connected to said actuator, and said supporting means including a guide member along which said movable electrode slides during its axial movement, said guide member and movable electrode having cooperable means for preventing relative rotation between them, an enlargement on the end of said guide member opposite to said one end cap, and a collar fixed to the interior of said opposite end cap and so located that it surrounds a portion of said guide member spaced from said enlargement, the internal diameter of said collar being smaller than the external diameter of said enlargement.

6. An electrical device as defined in claim 5 wherein said enlargement is externally threaded and said collar is internally threaded, said threads being cooperable so that said collar may be threaded past said enlargement during assembly of the device.

7. An electrical device as defined in claim 5 wherein said intermediate insulating section is formed of breakable material, and including a band of plastic material tightly surrounding said insulating section.

8. In an electrical device, a pressurized gas-tight cylindrical housing comprising conductive metallic end caps and an intermediate insulating section, relatively movable electrodes within said housing electrically connected to said end caps, respectively, means carried by one of said end caps for immovably supporting one of said electrodes and supporting the other for precisely guided movement in an axial direction, said supporting means including an axially arranged guide member along which said movable electrode slides during its axial movement, an enlargement on the end of said guide member opposite to said one end cap, and a collar fixed to the interior of said opposite end cap and so located that it surrounds a portion of said guide member spaced from said enlargement, the internal diameter of said collar being smaller than the external diameter of said enlargement.

9. An electrical device as defined in claim 8 wherein said enlargement is externally threaded and said collar is internally threaded, said threads being cooperable so that said collar may be threaded past said enlargement during assembly of the device.

10. In an electrical device, a cylindrical housing comprising conductive metallic end caps and an intermediate insulating section, relatively movable electrodes within said housing electrically connected to said end caps, respectively, means carried by one of said end caps for immovably supporting one of said electrodes and supporting the other for precisely guided movement in an axial direction, a movable actuator extending through the opposite end cap, and a transmission between said actuator and said movable electrode, said transmission including a screw-threaded element, a cooperating screw-threaded element connected to said actuator, a head element carried by said movable electrode, and a tongue and groove connection between said head element and said first-mentioned screw-threaded element.

References Cited

UNITED STATES PATENTS

| 1,625,330 | 4/1927 | Pinkus | 317—251 |
| 3,206,659 | 9/1965 | Goodman | 317—249 |
| 3,366,852 | 1/1968 | Goetzl | 317—245 |

ELLIOT A. GOLDBERG, Primary Examiner

U.S. Cl. X.R.

317—251